June 16, 1964 L. SHAPIRO 3,137,805

SIGNAL CONVERTING CIRCUIT

Filed Sept. 9, 1960

*INVENTOR.*
LOUIS SHAPIRO

*BY* Jacob Trachtman

ATTORNEY 3,137,805
SIGNAL CONVERTING CIRCUIT
Louis Shapiro, Erlton, N.J., assignor, by mesne assignments, to The First Pennsylvania Banking and Trust Company, as trustee
Filed Sept. 9, 1960, Ser. No. 54,988
5 Claims. (Cl. 315—30)

Figure 1:
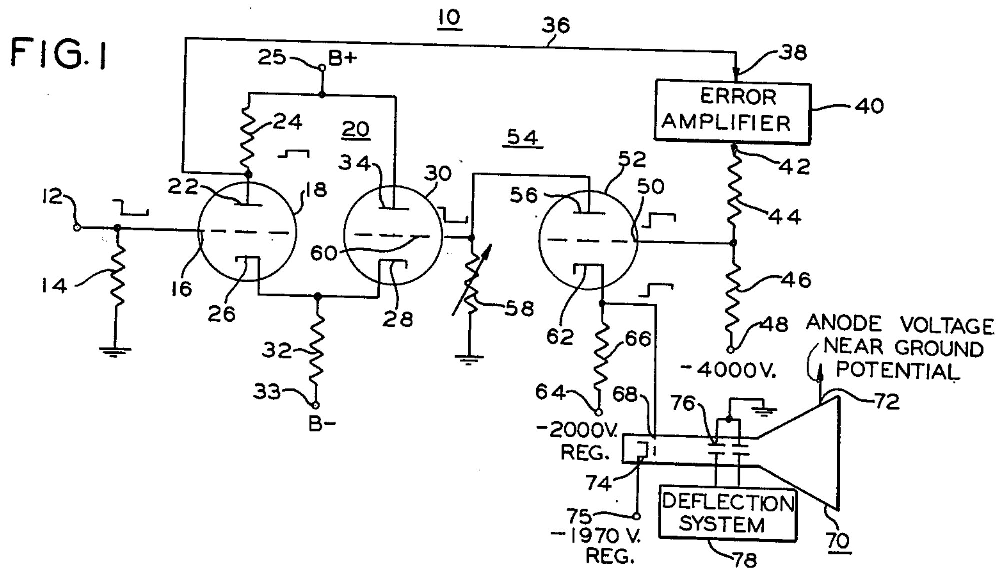

The invention relates to a signal converting circuit and more particularly to a modulation system for a cathode ray tube having its anode voltage near ground potential.

In information recording systems utilizing a cathode ray tube where the anode voltage is maintained near ground potential, the cathode must be maintained at a high negative voltage with respect to ground potential. Thus, to modulate the intensity of the electron beam the control electrode must also be maintained at a high negative voltage level. However, since the input information or modulation signal may be near ground potential, the signal converting circuit must provide a signal to the cathode ray tube at the appropriate negative level for proper modulation of the electron beam of the cathode ray tube.

Therefore, it is a primary object of the invention to provide a new and improved signal converting circuit for converting a signal from one potential level to another potential level.

Another object of the invention is to provide a new and improved signal converting circuit for accurately converting information signals at one potential level to signals at another potential level where such input signals may have low frequency signal components.

Another object of the invention is to provide a new and improved signal converting circuit for modulating the beam of a cathode ray tube with its anode voltage near ground potential.

Another object of the invention is to provide a new and improved signal converting circuit which utilizes feedback signals for obtaining high accuracy in its operation.

Another object of the invention is to provide a new and improved signal converting circuit which has utility in converting the potential level, and the phase and/or the amplitude of the alternating components of the input signal.

Another object of the invention is to provide a new and improved signal converting circuit for providing a modulating signal to the control grid of a cathode ray tube at a potential level different from that of the input signal and including means for readily adjusting the bias potential applied to the cathode ray tube.

Another object of the invention is to provide a new and improved signal converting system which is simple in construction and operation, is readily maintained in operation, and is inexpensive to manufacture.

The above objects of the invention are achieved in an embodiment of this invention by providing a signal converting circuit comprising a signal comparing means for receiving an information signal and a comparison signal and delivering an error signal, and a signal generating means. The signal generating means includes a plurality of impedance elements connected in series relationship across an energizing means with at least one of the impedance elements having its impedance controlled by the error signal for providing a comparison signal. The comparison signal is delivered to the comparing means and is responsive to the error signal. The generating means also provides an output signal related to the comparison signal. The comparison and output signals are derived from the junction points of the respective pairs of impedance elements.

One of the impedance elements, which has its impedance controlled by the error signal, is a valve having a control electrode receiving the error signal and anode and cathode electrodes for connecting the valve in series with the remaining impedance elements. The comparison signal is derived from the anode electrode of the valve, while the output signal is derived from the cathode electrode of the valve. One of the impedance elements, other than the valve, has an adjustable impedance for affecting the amplitude of the frequency components of the output signal with respect to the amplitude of the respective frequency components of the information or modulating signal.

An output signal with a negative potential level may be derived from the cathode of the valve by returning the cathode through a series impedance to a highly negative potential source.

The signal from the cathode of said valve may also be delivered to the cathode of an output valve having its anode returned to ground potential and its cathode connected to a highly negative potential through a resistor which has an adjustable tap. The tap provides a negative output signal which is delivered to the control grid of the cathode ray tube for providing bias control and a signal for modulating the intensity of the electron beam of the cathode ray tube.

Of course, the signal converting circuit may be utilized for many other purposes and adapted to provide signals having a potential level above the potential level of the input signal in accordance with the particular design requirements.

Figure 2:
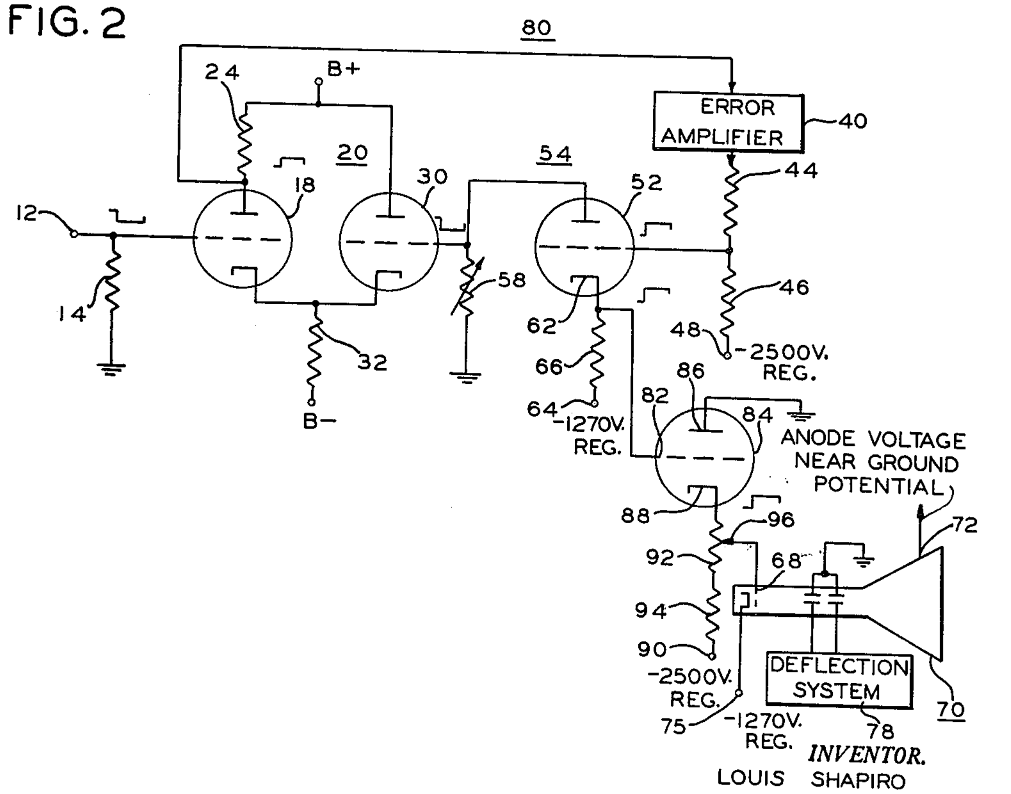

The foregoing and other objects of the invention will become more apparent as the following detailed description of the invention is read in conjunction with the drawings, in which:

FIGURE 1 diagrammatically illustrates in schematic form a signal converting circuit for modulating a cathode ray tube embodying the invention, and FIGURE 2 is a diagrammatic illustration in schematic form of the signal converting circuit of FIGURE 1 which has been modified to provide adjustable biasing means for the cathode ray tube.

Like reference numerals designate like parts througnout the several views.

FIGURE 1 diagrammatically illustrates in schematic form a signal converting circuit 10 for modulating the electron beam of a cathode ray tube which has its anode voltage near ground potential. The input terminal 12 of the illustrated embodiment is adapted for receiving negative-going information or modulating signals near ground potential. The input terminal 12 is returned to ground potential through an input resistor 14 and directly connected to the control electrode 16 of a valve 18 of a signal comparing circuit 20.

The valve 18 has its anode 22 returned to a positive potential at terminal 25 through an anode resistor 24, while its cathode 26 is directly linked to the cathode 28 of valve 30 of the signal comparing circuit 20.

The cathodes 26, 28 of valves 18, 30 are returned through a common cathode resistor 32 to a negative voltage potential at terminal 33, while the anode 34 of valve 30 is directly returned to the positive voltage potential at terminal 25.

The anode 22 of valve 18 of the signal comparing circuit 20 is also connected by a line 36 to the input 38 of an error signal amplifier 40. The output 42 of the amplifier 40 is returned through voltage dividing resistors 44, 46 to the terminal 48 at a negative potential of 4,000 volts.

The junction of the resistors 44, 46 is connected to the control electrode 50 of a valve 52 of a signal generating circuit 54. The anode 56 of valve 52 is returned to ground potential through a variable load resistor 58 and is directly connected to the electrode 60 of the valve 30 of the signal comparing circuit 20. The cathode 62 of valve 52 is returned to the terminal 64 at a negative potential of 2,000 volts through the cathode load resistor 66.

An output signal derived from the cathode 62 of the valve 52 is directly delivered to the beam control electrode 68 of the cathode ray tube 70. The anode 72 of the tube 70 has an anode voltage near ground potential, while the cathode 74 is connected to a negative potential of 1,970 volts for maintaining the required voltage drop between the anode 72 and cathode 74 for the cathode ray tube 70 as well as providing the appropriate negative bias voltage between the control electrode 68 and cathode 74, so that the beam intensity is at a zero or minimum value when a zero voltage signal excursion is delivered to the input terminal 12. Thus, the bias between the control electrode and cathode is the voltage across resistor 66 less any voltage difference between terminals 64 and 75. The horizontal and vertical pairs of deflection electrodes 76 each have one electrode maintained at ground potential while the other electrode receives appropriate signals from a deflection scanning system 78.

The values of the potential are given only for purposes of illustration and not in order to limit the scope of the invention. The negative potentials applied to the terminals 48, 64 and 75 are illustrated as regulated potentials for the purpose of increasing the accuracy of the signal converting circuit and modulating system.

In operation, upon receiving a negative-going signal at the input terminal 12, the control electrode 16 becomes more negative, decreasing the conduction of valve 18. This results in a positive-going signal at the anode 22 of valve 18 which is delivered to the error amplifier 40. The output 42 of the amplifier 40 similarly receives a positive-going signal (that is, one without phase inversion) which is delivered to the control electrode 50 of the valve 52 of the signal generating network 54. This results in increased conduction of the valve 52 which increases the voltage drop across the load resistor 58 and provides a negative-going comparison signal to the control electrode 60 of the valve 30 of the signal comparing circuit 20.

The decrease in potential of the control electrode 60 decreases the conduction of the valve 30, reducing the voltage drop across the cathode resistor 32 and lowering the potential of the cathodes 26, 28 of valves 18, 30. With the decrease of the potential in the cathode 26 with respect to the potential on the control electrode 16 of valve 18, the current through the valve 18 increases, reducing the potential at the anode 22 towards the value maintained with zero voltage signal excursion on the input terminal 12.

Thus, the error signal developed at the anode 22 of valve 18 results in the delivery of a comparison signal to the electrode 60 of valve 30 which is substantially equal to the input signal at terminal 12 tending to minimize the error signal. This is a feedback arrangement, causing the generator circuit 54 to develop a voltage signal across its load resistor 58 equal or proportional to the signal produced across the input resistor 14. This is accomplished by varying the impedance of the valve 52 and consequently the current through the valve 52 and the series connected impedances 58 and 66.

Since the control electrodes of the valves 30, 52, 70 are maintained at negative potentials with respect to their cathodes, their grid currents are negligible. Thus, the current flowing through the resistor 58 is equal to the current through the resistor 66, and this current is stabilized by the feedback loop to be proportional to the input signal. The potential drop across the resistor 58 is directly proportional to the potential drop across the resistor 66 and in the ratio of their respective resistance values. By varying the resistance of the resistor 58, the ratio of the anode and cathode resistors 58, 66 may be varied, thereby directly varying the ratio of the potential drops across these resistors. Of course, since the potential drop across the resistor 58 is equal to the potential drop across the input resistor 14, the ratio of the amplitudes of the alternating frequency components of the output signal delivered at the cathode 62 of the valve 52 is also adjusted by varying the resistance of the resistor 58.

Since the cathode 62 is returned to a highly negative potential of 2,000 volts at terminal 64 through the cathode resistor 66, a highly negative signal is provided at the cathode 62 for delivery to the control electrode 68 of the cathode ray tube 70.

Of course, the circuit is designed so that the control electrode 68 of the cathode ray tube 70 is negatively biased with respect to the cathode 74 to produce a zero or minimum value beam intensity when a zero voltage signal excursion is delivered to the input terminal 12. Thus, when a negative signal excursion is provided at the terminal 12, the error signal from the valve 18 causes the valve 52 to become more conductive, resulting in a less negative signal being delivered to the control electrode 68 of the cathode ray tube 70. This increases the intensity of the cathode ray beam at the tube 70.

Although the signal converting circuit has been illustrated in connection with a modulating system for a cathode ray tube, the circuit may be applied to various other applications evident to those skilled in the art.

Similarly, the signal converting circuit may be utilized for providing an output signal having a potential level higher than the potential level of the input signals to the terminal 12, and may with appropriate modification for design requirements have an output signal derived from the anode circuit as compared to the output isgnal from the cathode circuit in the illustrated embodiment.

FIGURE 2 diagrammatically illustrates in schematic form a signal converting circuit 80 which is identical to the circuit 10 except that the output signal derived from the cathode 62 of valve 52 is delivered to the control electrode 82 of an output tube 84, and the negative potential to the terminals 64 and 75 is 1,270 volts, while the negative potential of 2,500 volts is provided to the terminal 48.

The valve 84 has its anode 86 connected directly to ground potential, while its cathode 88 is returned to the terminal 90 at a negative potential of 2,500 volts through a tapped resistor 92 in series with the resistor 94. The adjustable tap 96 of the resistor 92 is connected with the control electrode 68 of the cathode ray tube 70 for providing the modulated cathode ray beam.

In this modified form, the circuit 80 allows the negative bias potential supplied to the control electrode 68 of the cathode ray tube 70 to be adjusted by changing the position of the tap 96 on the resistor 92.

The ratio of the frequency components (that is, the excursions) of the output signal to the control electrode 68 of the cathode ray tube 70 to the input signal excursions delivered to the terminal 12 may be adjusted by varying the resistance of the anode resistor 58 as previously described after the biased voltage has been set.

While only several representative embodiments of the invention disclosed herein have been described in detail, there will be obvious to those skilled in the art, many modifications or variations accomplishing the foregoing objects and realizing many or all of the advantages, but which yet do not depart essentially from the spirit of the invention.

What is claimed is:

1. A signal converting circuit comprising means for comparing an input signal and a feedback signal and for producing an error signal in accordance with the difference between the input and feedback signals, means for amplifying said error signal and for producing said feedback signal and an output signal therefrom, said amplifying and signal producing means including an electron control device and a plurality of impedance elements connected in a series circuit with said control device connected between said impedance elements, said control device being connected for its impedance to be controlled in accordance with said error signal, means connected to said impedance element on one side of said control device for supplying said feedback signal to said comparing means to minimize said error signal, and a high-impedance output device connected to said impedance element on the other side of said control device for receiving an output signal proportional to said feedback signal, said electron control device producing oppositely phased feedback and output signals.

2. A signal converting circuit as recited in claim 1 wherein one of said impedance elements is variable to adjust the output signal variations in proportion to the feedback signal variations.

3. A signal converting circuit comprising means for comparing an input signal and a feedback signal and for producing an error signal in accordance with the difference between the input and feedback signals, means for amplifying said error signal and for producing said feedback signal and an output signal therefrom, said amplifying and signal producing means including an electron control device and a plurality of impedance elements connected in a series circuit with said control device connected between said impedance elements, said control device being connected for its impedance to be controlled in accordance with said error signal, means connected to said impedance element on one side of said control device for supplying said feedback signal to said comparing means to minimize said error signal, and a high-impedance output device connected to said impedance element on the other side of said control device for receiving an output signal proportional to and of phase opposite to that of said feedback signal, said high-impedance output device including a cathode ray tube, and means connecting terminals of said other side impedance element to the grid and cathode electrodes of said tube so that the voltage across said impedance terminals is substantially supplied across said grid and cathode electrodes to control the beam intensity of the cathode ray tube.

4. A signal converting circuit comprising means for comparing an input signal and a feedback signal and for producing an error signal in accordance with the difference between the input and feedback signals, means for amplifying said error signal and for producing said feedback signal and an output signal therefrom, said amplifying and signal producing means including an electron control device and a plurality of impedance elements connected in a series circuit with said control device connected between said impedance elements, said control device being connected for its impedance to be controlled in accordance with said error signal, means connected to said impedance element on one side of said control device for supplying said feedback signal to said comparing means to minimize said error signal, and a high-impedance output device connected to said impedance element on the other side of said control device for receiving an output signal proportional to and of phase opposite to that of said feedback signal, said high-impedance output device including voltage controlled means, and means connecting terminals of said other side impedance to said voltage controlled means so that the voltage between said terminals is effectively applied to said voltage controlled means.

5. In an information recording system, a signal converting circuit comprising means for comparing an input information signal and a feedback signal and for producing an error signal in accordance with the difference between the input and feedback signals, means for amplifying said error signal and for producing said feedback signal and an output signal therefrom, said amplifying and signal producing means including an electron control device and a plurality of impedance elements connected in a series circuit with said control device connected between said impedance elements, said control device being connected for its impedance to be controlled in accordance with said error signal, means connected to said impedance element on one side of said control device for supplying said feedback signal to said comparing means to minimize said error signal, and a high-impedance output device connected to said impedance element on the other side of said control device for receiving an output signal proportional to and of phase opposite to that of said feedback signal, one of said impedance elements being varible to adjust the output signal variations in proportion to the feedback signal variations, said high-impedance output device including a cathode ray tube, and means connecting terminals of said other side impedance element to the grid and cathode electrodes of said tube so that the voltage across said impedance terminals is substantially supplied across said grid and cathode electrodes to control the beam intensity of the cathode ray tube.

References Cited in the file of this patent

UNITED STATES PATENTS

| | | |
|---|---|---|
| 2,796,468 | McDonald | June 18, 1957 |
| 2,953,752 | Porter | Sept. 20, 1960 |
| 2,965,853 | MacDonald | Dec. 20, 1960 |